(12) United States Patent
Engle (10) Patent No.: US 9,361,023 B2
(45) Date of Patent: Jun. 7, 2016

(54) METHOD OF CAPTURING SYSTEM INPUT BY RELATIVE FINGER POSITIONING

(71) Applicant: Garett Engle, Palo Alto, CA (US)

(72) Inventor: Garett Engle, Palo Alto, CA (US)

(73) Assignee: Garrett Engle, Palo Alto, CA (US)

( * ) Notice: Subject to any disclaimer, the term of this patent is extended or adjusted under 35 U.S.C. 154(b) by 0 days.

(21) Appl. No.: 14/745,921

(22) Filed: Jun. 22, 2015

(65) Prior Publication Data

US 2015/0286403 A1 Oct. 8, 2015

Related U.S. Application Data

(63) Continuation of application No. 13/904,029, filed on May 29, 2013.

(60) Provisional application No. 61/652,826, filed on May 29, 2012.

(51) Int. Cl.
| | | |
|---|---|---|
| *G06F 3/048* | (2013.01) | |
| *G06F 3/0488* | (2013.01) | |
| *G06F 3/01* | (2006.01) | |
| *G06F 3/03* | (2006.01) | |

(52) U.S. Cl.
CPC ............ *G06F 3/04886* (2013.01); *G06F 3/017* (2013.01); *G06F 3/0304* (2013.01)

(58) Field of Classification Search
CPC combination set(s) only.
See application file for complete search history.

(56) References Cited

U.S. PATENT DOCUMENTS

| | | | |
|---|---|---|---|
| 6,614,422 B1* | 9/2003 | Rafii ...................... | G06F 1/1626 345/156 |
| 2010/0231522 A1* | 9/2010 | Li .......................... | G06F 3/0423 345/169 |
| 2011/0216007 A1* | 9/2011 | Cheng ...................... | G06F 3/02 345/168 |
| 2014/0337786 A1* | 11/2014 | Luo ........................ | G06F 3/0416 715/773 |

\* cited by examiner

*Primary Examiner* — Van Chow
(74) *Attorney, Agent, or Firm* — Smith Tempel; Gregory Scott Smith (57) ABSTRACT

A reader is utilized to detect motion of a user's fingers when a user mimics a typing motion. The system can be used to define various key press states for particular finger positions and then monitor the motion of fingers to detect when a key state is entered. The system can then provide the detected key state as input to a system expecting the data input.

11 Claims, 11 Drawing Sheets

FIG. 1

PRIOR ART

METHOD OF CAPTURING SYSTEM INPUT BY RELATIVE FINGER POSITIONING

CROSS-REFERENCE TO RELATED APPLICATIONS

This is a utility patent application being filed in the U.S. as a non-provisional application for patent under Title 35 U.S.C. §100 et seq. and 37 C.F.R. §1.53(b) and, claiming the benefit of the prior filing date under Title 35, U.S.C. §119(e) of the U.S. provisional application for patent that was filed on May 29, 2012 and assigned Ser. No. 61/652,826, which application is incorporated herein by reference in its entirety. This application is a continuation application of U.S. application Ser. No. 13/904,029, filed May 29, 2013, incorporated herein by reference in its entirety.

BACKGROUND

As the demands of the portable market has pushed electronic devices smaller and lighter, the user interface devices, such as displays and keyboard input devices have set limitations on how small the devices can become. Touch screens have been used to provide combined keypad and video display but, the size of the displayed keys is limited by the requirement of the user to be able to select and the system to be able to distinguish between key presses.

As electronic devices beyond PCs and laptops continue to grow in popularity, there is a need to interact with smartphones, tablets, TVs, game consoles, etc., more and more. While simple navigation has always been easy on these devices, it is entering data from a keyboard that has been the biggest challenge. Soft keyboards (such those found on smart phones) can be too rigid, small and lack typing feedback. Portable keyboards have to be carried around with the user defeating the purpose and/or convenience of the device.

To overcome this problem many ideas are being proposed of projecting a virtual keyboard onto the surface in front of the user (via lasers or light) or having some form of light-weight, touch interface that displays a soft keyboard for data input. These implementations, however, don't solve the root of the problems described above but are, rather, just different manifestations of them.

When typing on a virtual keyboard—whether projected onto a surface in front of the user or displayed within a touch-sensitive display—the key presses are determined by where a given finger is relative to the input device (e.g. how close to the desired key the finger pressed). This creates a hard dependency to always conform to the area, limits and behavior of the virtual device to type accurately.

Thus, there is a need in the art for a solution to allow portable devices, as well as other electronic type devices to be completely independent of any restrictions for a keyboard entry mechanism.

BRIEF SUMMARY

Embodiments of the present invention operate to capture input by relative finger positioning. Such embodiments alleviate the shortcomings in the market. In general, various embodiments utilize the relative position of each finger within a 3D space to determine the key being pressed by a user and, thus eliminating any dependencies upon virtual keyboards of any type and the limitations they impose.

More specifically, in one embodiment a reader is utilized to detect motion of a user's fingers when a user mimics a typing motion. The system can be used to define various key press states for particular users and then monitor the motion of fingers to detect when a key state is entered. The system can then provide the detected key state as input to a system expecting the data input.

These and other embodiments, aspects, functions and variations will be presented in more detail in conjunction with a description of the figures.

DETAILED DESCRIPTION OF EMBODIMENTS

Presented within this disclosure, including the figures, claims and other sections, is various embodiments of a three-dimensional (3D) reader that is able to track the location and position of objects, to derive at a conclusion as to the intended action(s) to be invoked based upon the motion of the objects (such as the changing of the location and position of the objects) and then to invoke such intended actions. Although various embodiments are described, as well as features, aspects, elements, applications and functions of the various embodiments, it will be appreciated that the present invention is not limited to the actually disclosed embodiments but rather, that the disclosure simply provides examples of the embodiments to facilitate the understanding of the various aspects of the invention.

More specifically, the present disclosure presents embodiments of a simulated or virtual keyboard that does not require a physical, projected, or other representation of a keyboard but rather, simply tracks the location, position and movement of the subject's fingers. The various embodiments include a 3D reader that is configured to track the location and position of a subject's fingers, as well as an engine configured to process the 3D data to determine keystroke operations intended by the movement of the fingers. It will be appreciated that although the various embodiments will be described as a 3D reader and an engine that tracks finger motions and identifies intended keystrokes, that the present invention is not limited to such embodiments or applications. Those skilled in the art will appreciate other applications in which the various embodiments can be incorporated. A few non-limiting examples include tracking finger and hand movements during surgery, typing, data entry, piano playing, guitar playing, etc., tracking tool motions, tracking writing instrument movements, tracking motion of a paint brush by an artist, tracking finger and hand movements for sign language, tracking lip, mouth and facial movements to identify speech elements, track motion of other body parts coupled to an interpretation engine to assist handicapped individuals with limited motion to provide control of medical devices and/or computer inputs, etc.

Turning now to the figures in which like elements are represented by similar labels throughout the several views, embodiments of a 3D reader generate data representing the motions of fingers and, an engine to processes the 3D data to determine keystroke input.

Figure 1:
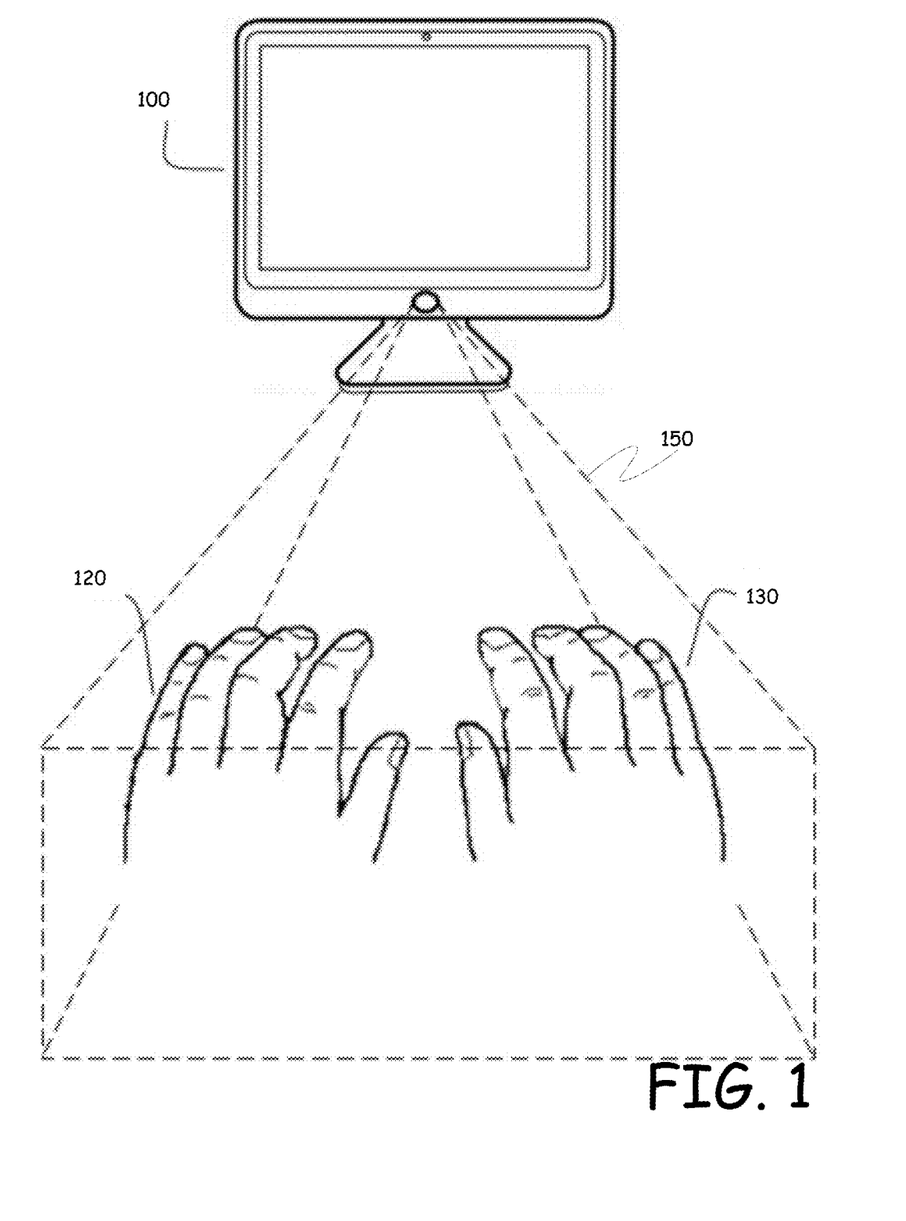
FIG. 1 is a conceptual drawing illustrating an exemplary embodiment of a 3D reader and engine utilized to identify intended keystrokes of a user.

FIG. 1 is a conceptual drawing illustrating an exemplary embodiment of a 3D reader and engine utilized to identify intended keystrokes of a user. When a user wishes to type input into a system, the user places their left hand 120 and right hand 130 in front of a 3D reader 100. The reader 100 is able to determine the location and position of each finger of each hand of the user within a 3D space 150. The 3D reader is able to detect motion of the fingers with sufficient fidelity to clearly detect that the user wishes to "press a key" when one or more fingers move.

The term "Press a key" is in quotes because physical keys (or virtual keys projected in front of the user or within a display) may not be presented to the user (nor are they needed). Rather, the 3D reader operates to monitor or track the actual physical actions that a user would perform in the pressing of an actual key or virtual key, even in the absent of such actual or virtual keyboard.

Figure 2:
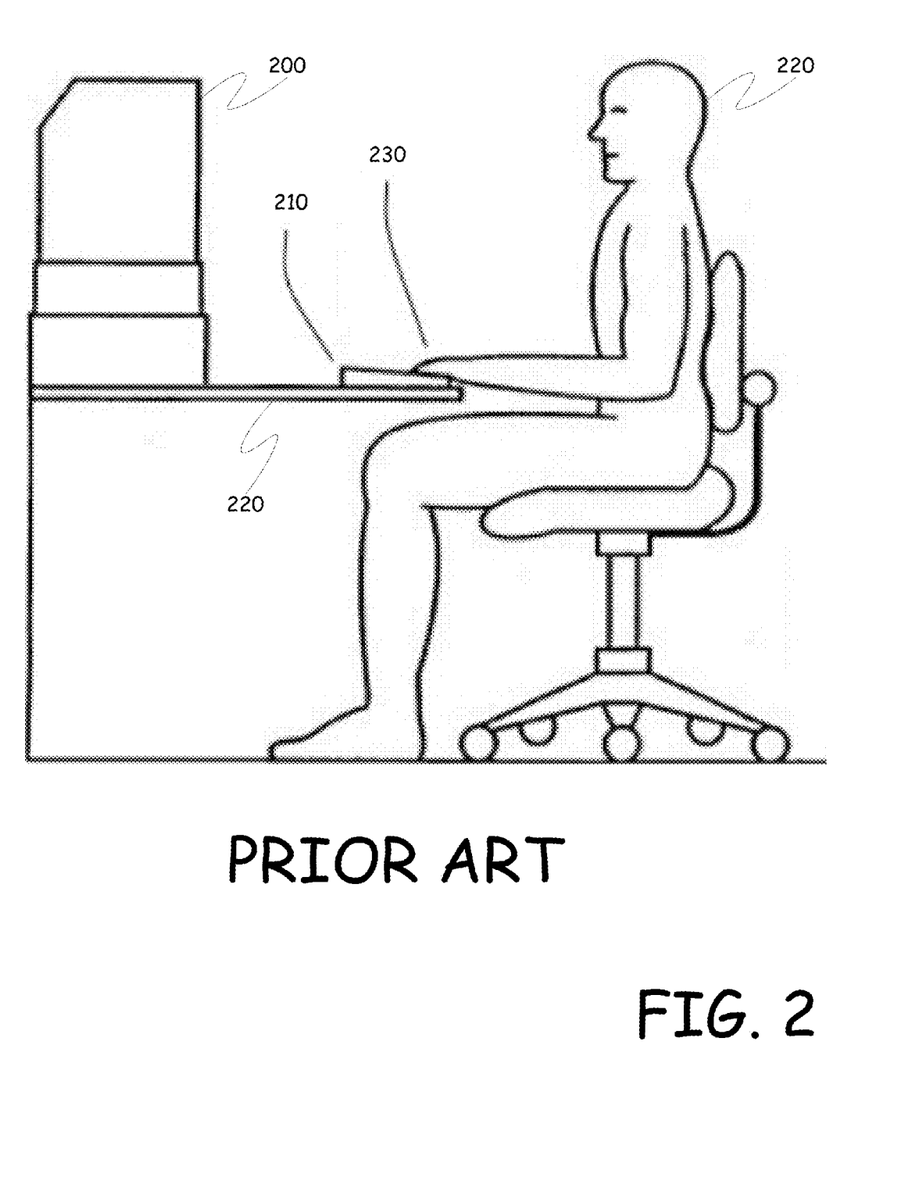
FIG. 2 is a view of current state of the art technology for entering data using a keyboard.

FIG. 2 is a view of current state of the art technology for entering data using a keyboard. A computer system 200 includes either a physical or virtual keyboard 210 that is located proximate to the computer system 200, typically on the surface of a table 220 directly in front of the computer system 200. A user 220 is positioned in front of the computer system 200 with the users hands 230 resting on or over the keyboard or virtual keyboard 210.

Figure 3:
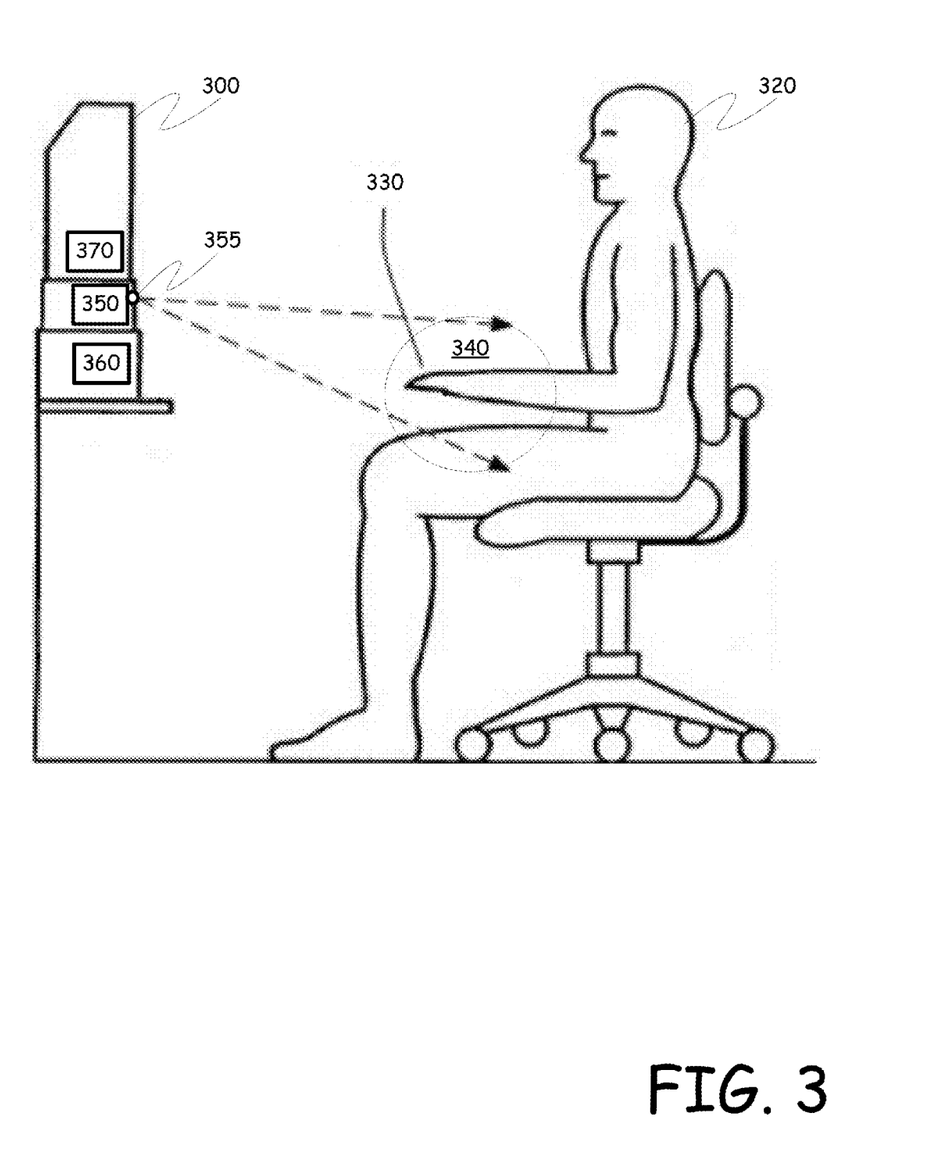
FIG. 3 is a conceptual diagram illustrating an environment in which embodiments of the 3D reader and engine can be implemented.

FIG. 3 is a conceptual diagram illustrating an environment in which embodiments of the 3D reader and engine can be implemented. In the illustrated embodiment, a computer system 300, equipped with the 3D reader and engine is being utilized by a user 320. The exact same motions that the user would take to type on a physical keyboard are taken when entering data with the 3D reader.

It will be appreciated that although the illustrated embodiment is described as a computer system 300 that includes the 3D reader and engine, the 3D reader and/or the engine can be internal or external to the computer system 300.

For example, in some embodiments, the 3D reader may be device that is external to the computer system 300 and that communicates with an engine that is located within the computer system 300 (i.e, is a software application operating by the processor within the computer system 300). In this embodiment, motion data is collected by the 3D reader and then relayed either wirelessly or over a physical connection to the engine within the computer system 300. The engine then processes the motion data to determine intended key presses and then interfaces with other applications on the computer system 300 to provide indicia of the key presses.

In other embodiments, the 3D reader and the engine may be external to the computer system 300. In such embodiments, the external 3D reader tracks finger motions and then relays 3D motion data to the external engine. The engine can then process the data and determine intended key presses and then communicate the key presses to the computer system 300 through the standard keyboard port, such as USB, RS232 or any other physical port, as well as wireless ports (i.e., Blue Tooth, WIFI, or other wireless technologies). In such an embodiment, the external 3D reader and engine simply appear as a keyboard input to the computer system 300.

In yet another embodiment, the 3D reader may be internal to the computer system 300 and then the 3D reader and or computer system 300 communicates the motion data to an external engine. Again, in such an embodiment the engine can then process the data and determine intended key presses and then communicate the key presses to the computer system 300 through the standard keyboard port, such as USB, RS232 or any other physical port, as well as wireless ports (i.e., Blue Tooth, WIFI, or other wireless technologies). In such an embodiment, the external 3D reader and engine simply appear as a keyboard input to the computer system 300.

Yet even further, and an embodiment that will be most thoroughly described herein, the 3D reader and engine may be internal to the computer system 300. In this embodiment, the 3D reader detects finger motions, communicates with the engine which then provides key board press data to the computer system 300. However, it will be appreciated that other variations are also anticipated, such as connecting the reader and/or engine to a system over a wired or wireless network, etc.

It should be appreciated that the provision of the keyboard press data derived by the engine can be presented in a variety of techniques depending on the systems in which the 3D reader and engine are incorporated. As such, the key press information can be conveyed through the basic input and output system (BIOS) of the computer system, directly into an application expecting key presses, etc. Those skilled in the relevant art will appreciate the various techniques for integrating the 3D reader and engine with the hardware and software of the computer system 300 or any other device with which the 3D reader and engine are used.

It should be appreciated that the 3D reader and engine can be implemented in software, hardware, firmware as well as any combination of the same.

Using the internally implemented embodiment as a non-limiting example, the 3D reader 350 monitors the motion hand and finger 330 motion of a user 320 when the hands 330 are within a 3D space 340 located proximate to the computer system 300. It will be appreciated that in the embodiments that allow the 3D reader to be external to the computer system 300, the 3D space 340 can be located anywhere and does not have to be proximate to the computer system 300. The 3D reader 350 includes a lens 355 that is used to obtain video data of the hand and finger motions. This motion data is then provided directly to the engine 360 or, the 3D reader 350 may conduct some level of pre-processing prior to communicating the data to the engine 360, such as filtering, compressing, etc.

The engine 360 then analyzes the video data and identifies key presses associated with the motion data. The key press information is then conveyed to a processor 370 within the computer system 300 through any of the available techniques.

Figure 4:
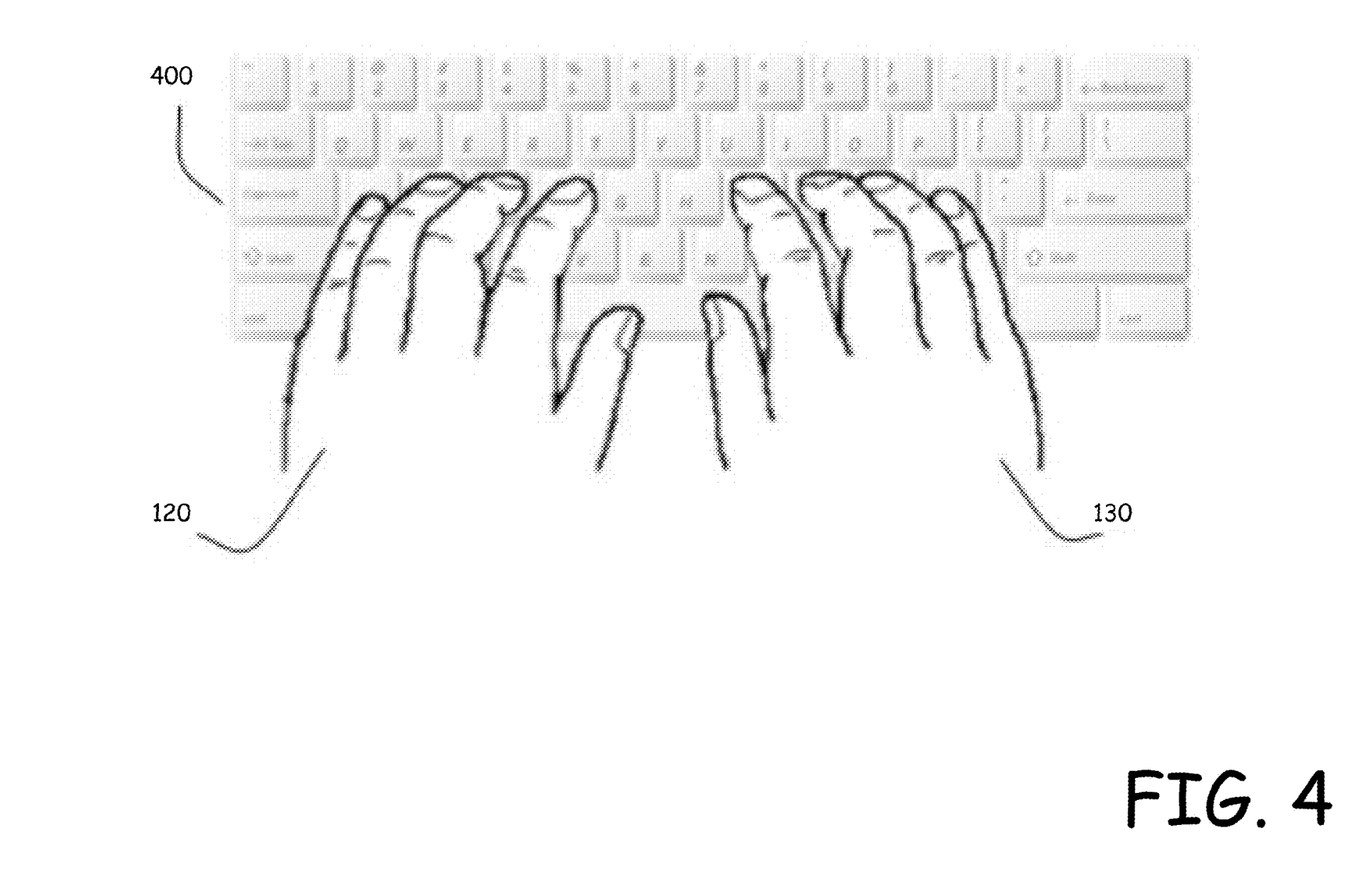
FIG. 4 is a diagram depicting the typical positioning of a user's hands over a keyboard.

FIG. 4 is a diagram depicting the typical positioning of a user's hands over a keyboard. The users left hand 120 and right hand 130 are shown as being positioned over a keyboard 400 for conventional typing. It will be appreciated, as presented further below, that non-conventional postures may also be utilized in various embodiments and the system can be calibrated for any keyboard structure, typing posture, etc.

Figure 5:
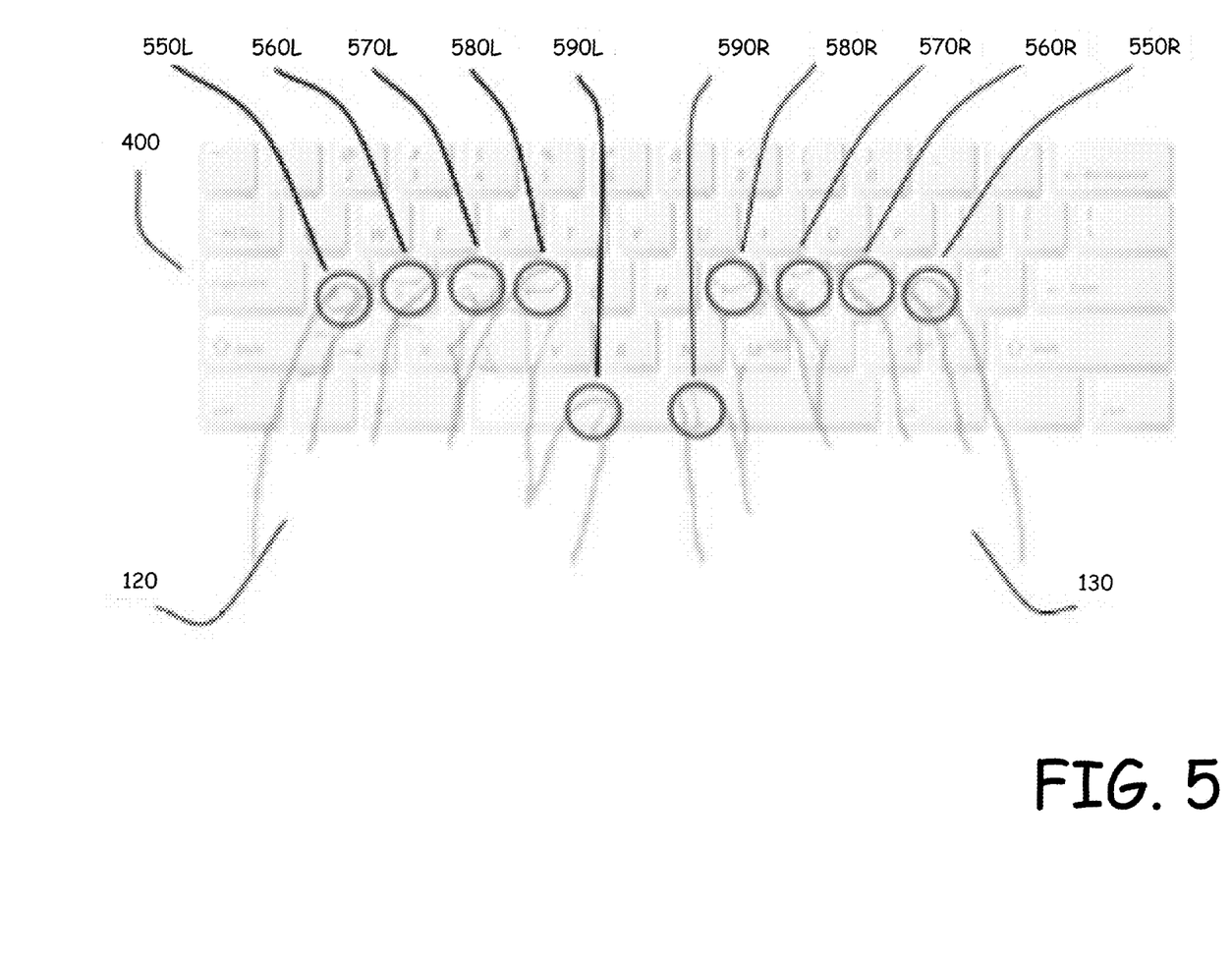
FIG. 5 is a diagram illustrating the typical positioning of a user's left and right hand on a keyboard with emphasis on the position of the finger tips.

FIG. 5 is a diagram illustrating the typical positioning of a user's left and right hand on a keyboard with emphasis on the position of the finger tips. Here the reader (not shown), is configured to track the position of each finger by monitoring the location, position and movement of the tips of each finger (left pinky 550L, right pinky 550R, left "ring-finger" 560L, right "ring-finger" 560R, left middle finger 570L, right middle finger 570R, left index finger 580L, right index finger 580R, left thumb 590L and right thumb 590R) overlaid onto a keyboard 400 that resides in a virtual model internal to the reader. Thus, a keyboard or virtual keyboard external to the computer system is not required, although the various embodiments are not limited to operating without such a keyboard, virtual keyboard or any other representation of a keyboard.

The position of each finger tip (550L, 550R, 560L, 560R, 570L, 570R, 580L, 580R, 590L and 590R) collectively make a unique position-state. In this case the "default" state (i.e. the default position for touch-typing) is showing indicating to the reader the user is ready to type. Note that this unique default-state is being demonstrated visually in only two dimensions (via the two dimensional location of the finger tips) whereas the reader may have access to multi-dimensions (3D space, infra-red, time etc . . . ) to model a unique multi-dimensional default-state. For instance, a video camera or motion sensor may be utilized to track motion of fingers in 3D, while an infra-red sensor can also track motion based on heat signatures of muscles etc., and the timing, such as duration of movement, etc., may also be used as motion data.

In either case, regardless of how many dimensions are used, a unique default-state is identified. FIG. 5, FIG. 6, FIG. 7, FIG. 8 and FIG. 9 will continue to be described utilizing only a two-dimensional state for the simplicity of demonstrating the logic of the system.

Figure 6:
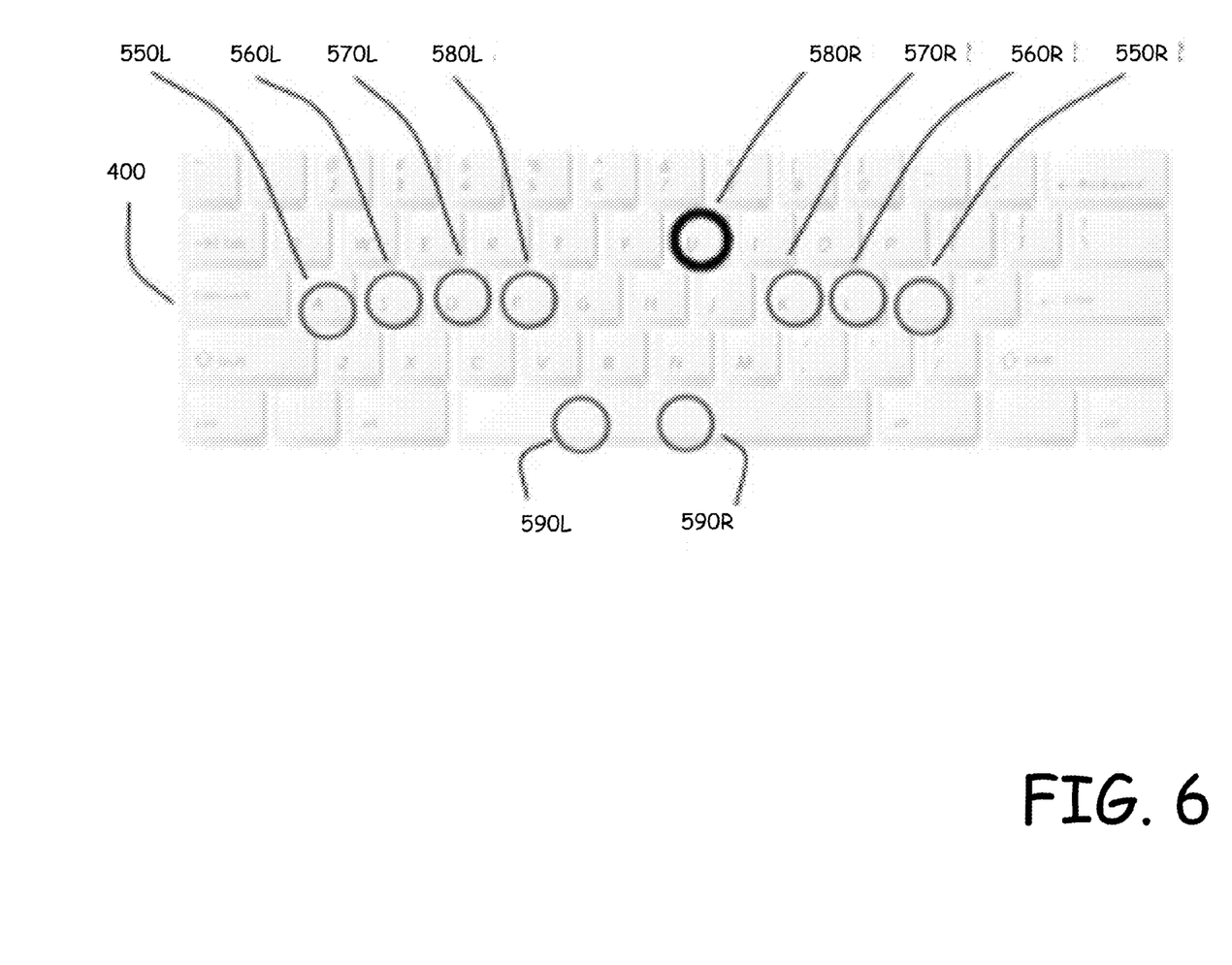
FIG. 6 is a layout diagram illustrating detection of the fingers in a typing state to strike the "u" key.

FIG. 6 is a layout diagram illustrating detection of the fingers in a typing state to strike the "u" key. FIG. 6 is a top view of the user's finger positions (550L, 550R, 560L, 560R, 570L, 570R, 580L, 580R, 590L and 590R) when the user's right index finger 580R is stretched out intending to actuate the "u" key. Because the right index finger position 580R is in a different location from the default position illustrated in FIG. 5, this constitutes a new state. In this case the collective finger tips positions of the right hand (550R, 560R, 570R, 580R and 590R) make up the "u"-key-state.

Figure 7:
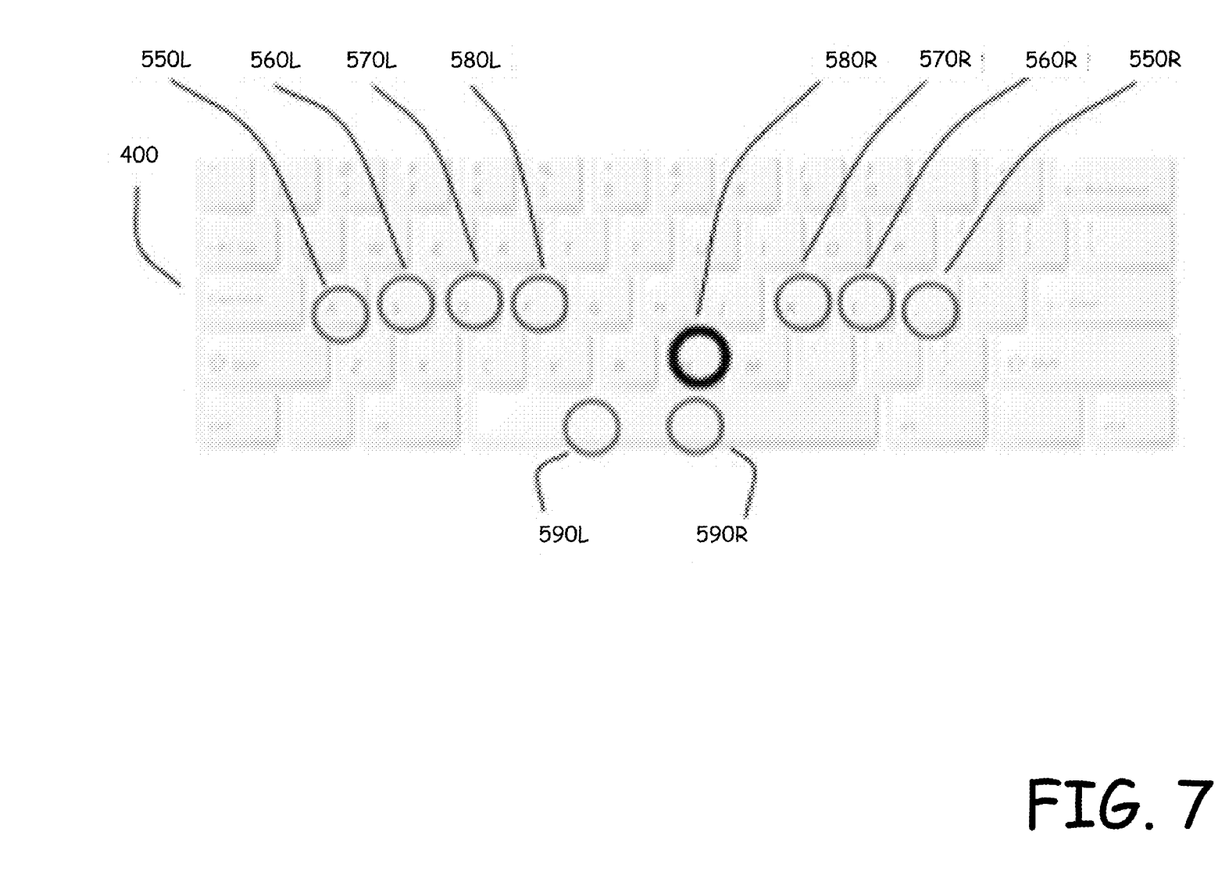
FIG. 7 is a layout diagram illustrating the detection of the fingers in another typing state to strike the "n" key.

FIG. 7 is a layout diagram illustrating the detection of the fingers in another typing state to strike the "n" key. Similar to FIG. 6, above FIG. 7 displays the top view of the user's finger positions (550L, 550R, 560L, 560R, 570L, 570R, 580L, 580R, 590L and 590R) when the user's right index finger is bent down intending to type the "n" key. Because the right index finger position 580R is in a different location this constitutes a new state. In this case, the collective finger tips positions of the right hand (550R, 560R, 570R, 580R and 590R) make up the "n"-key-state.

Figure 8:
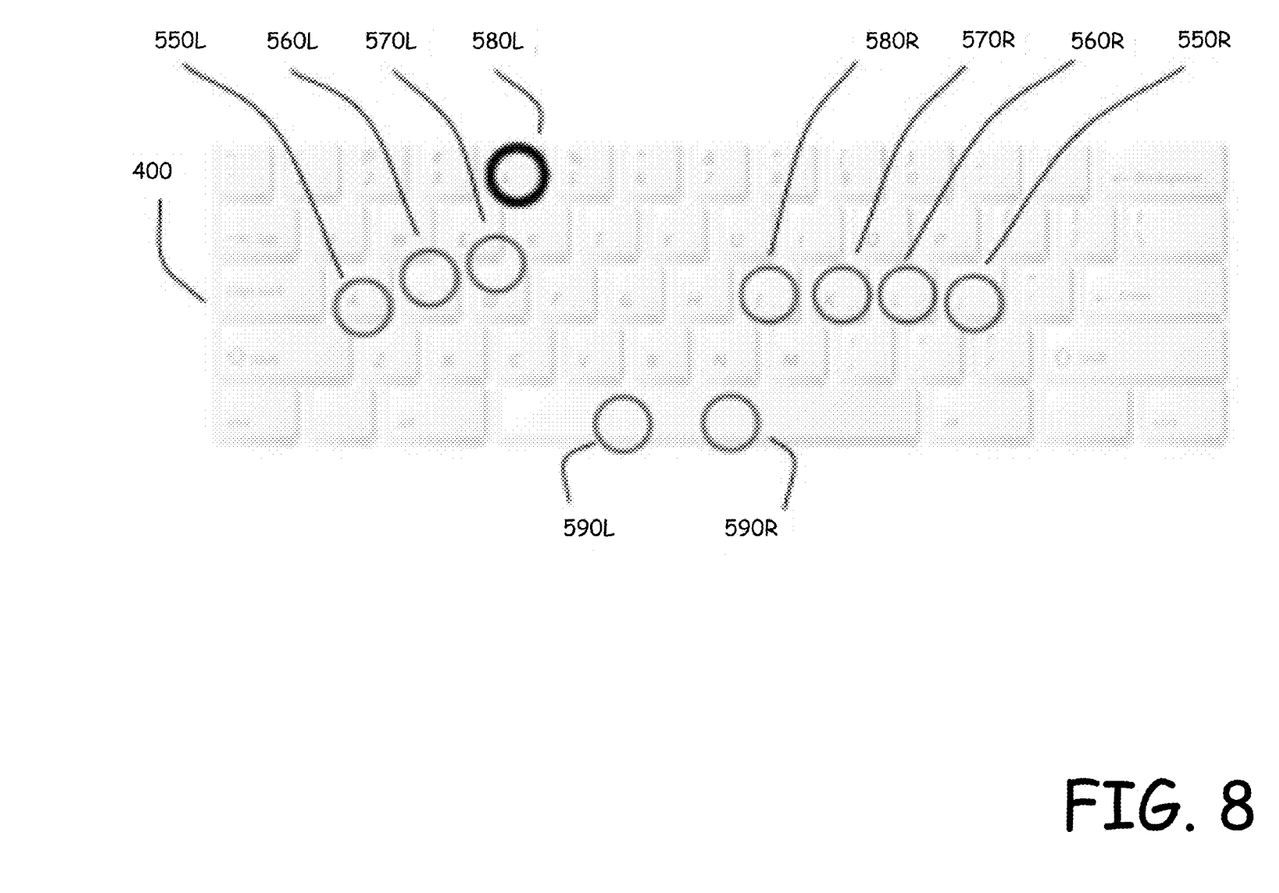
FIG. 8 is a layout diagram illustrating the detection of the fingers in another typing state to strike the "4" key.

FIG. 8 is a layout diagram illustrating the detection of the fingers in another typing state to strike the "4" key. FIG. 8 displays the top view of the user's finger positions (550L, 550R, 560L, 560R, 570L, 570R, 580L, 580R, 590L and 590R) when the user's left index finger is stretched out intending to type the "4" key. Because the left index finger position 580L is in a different location this constitutes a new state. In this case the collective finger tips positions of the left hand (550L, 560L, 570L, 580L and 590L) make up the "4"-key-state. It should also be noted that when a user attempts to type a particular key, such as the "4" key as illustrated in FIG. 8, other fingers on the hand may move as well. For example, in the illustration, the position of the left ring finger position 560L and position of the middle finger 570L have also slightly moved as the user reached for the "4" key.

It's not important how far one key-state deviates from another (or the default-state) but, rather, that a unique state is established for each key (that is, there is no requirement that only one finger can move).

Figure 9:
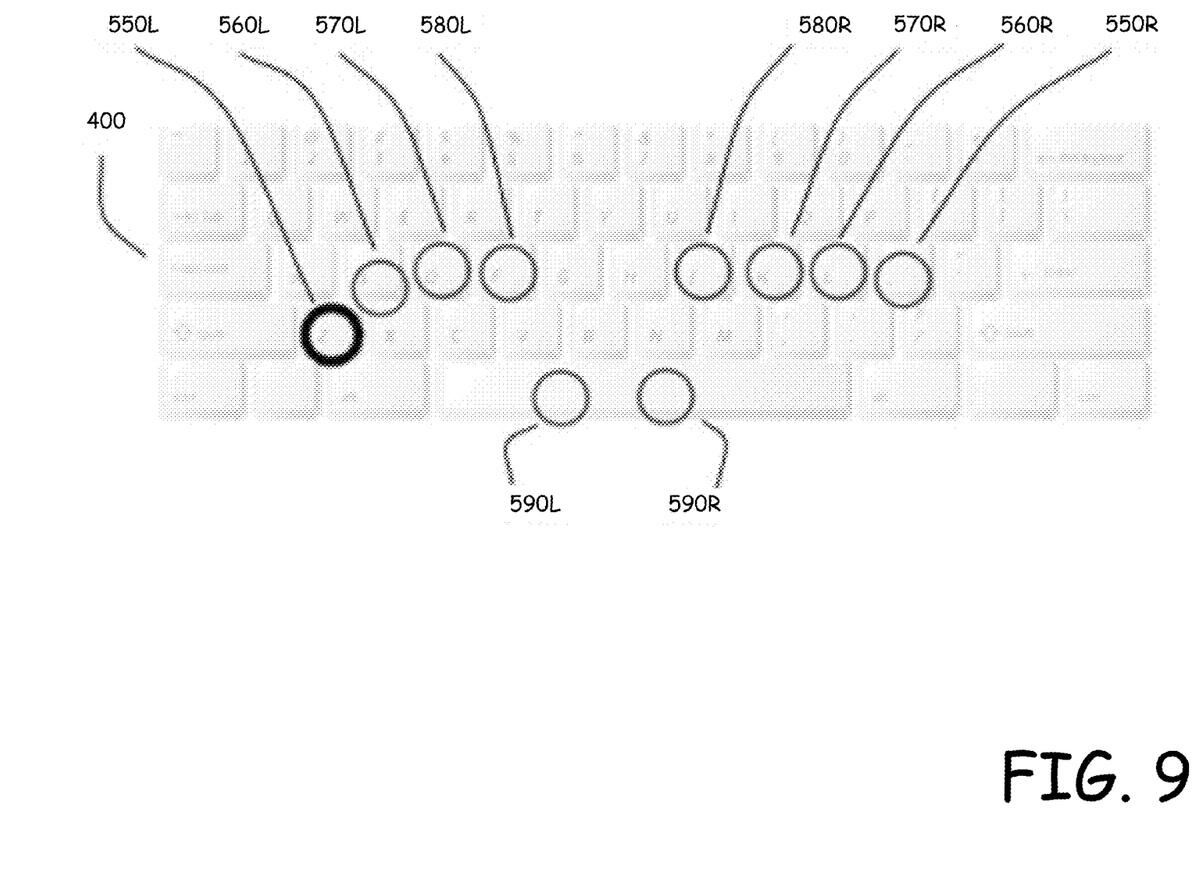
FIG. 9 is a layout diagram illustrating the detection of the fingers in another typing state to strike the "z" key.

FIG. 9 is a layout diagram illustrating the detection of the fingers in another typing state to strike the "z" key. FIG. 9 displays the top view of the user's finger positions (550L, 550R, 560L, 560R, 570L, 570R, 580L, 580R, 590L and 590R) when the user's left index finger is bent down intending to type the "z" key. Because the left index finger position 550L is in a different location this constitutes a new state. In this case the collective finger tips positions of the left hand (550L, 560L, 570L, 580L and 590L) make up the "z"-key-state.

Similar to FIG. 8, in the state illustrated in FIG. 9, other fingers move in an effort to strike the z key. In the illustrated layout, the left "ring-finger" 560L moves as well when the user "presses" the "z" key.

The various embodiments may define key states based on the position of fingers, location of fingers, the position of fingers relative to the other fingers and/or a surface or other item, the position of the hand, looking at the entire fingers or just a certain portion of the fingers, or the like.

Figure 10:
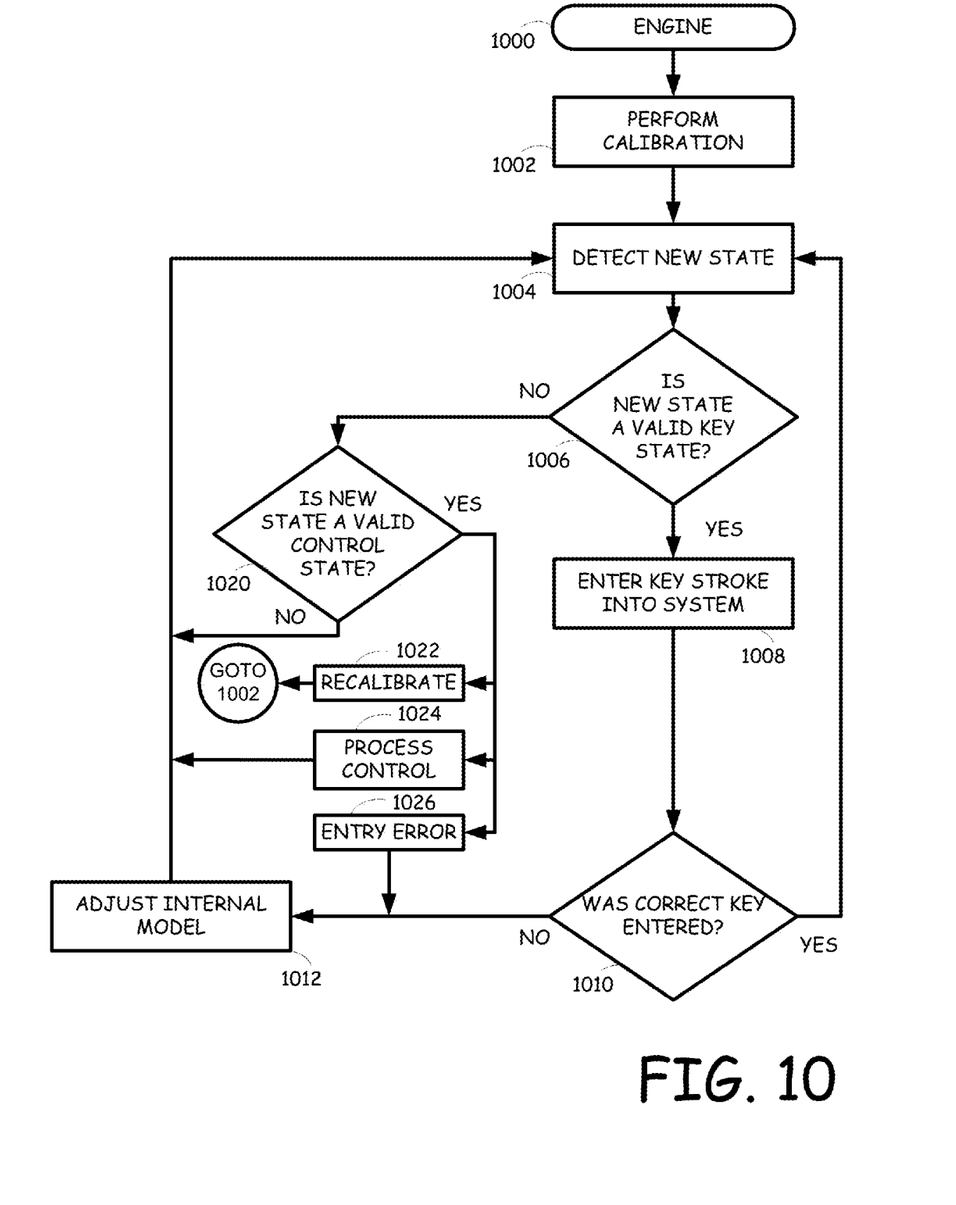
FIG. 10 is a flow diagram illustrating the actions that an exemplary engine may take in processing the finger motion of a user when producing a key press.

FIG. 10 is a flow diagram illustrating the actions that an exemplary engine may take in processing the finger motion of a user when producing a key press. It will be appreciated that all of the functions or actions described in conjunction with FIG. 10 may not be necessary in all embodiments of the engine and, the separation or delineation of the functions or actions represented in FIG. 10 is only for descriptive purposes. As such, the illustrated functions may correspond with particular modules or system elements but, in other embodiments functions or actions can be combined or bifurcated into other modules or systems. Further, although the actions describe in connection with FIG. 10 are described as the engine, it will be appreciated that some or all of the actions may be performed by the 3D reader and/or the computer system.

Initially, the engine 1000 operates by invoking or conducting a calibration process 1002. As previously mentioned, different users may move their fingers differently for various key presses. More particularly, the size, shape, and movement of various parts of the hand can vary between users and as such, in some embodiments, a calibration process can be performed to more accurately process the various key presses and identify the various key states. However, it will also be appreciated that in some embodiments, a calibration process is not required and the system may default to a particular state definition or load a predefined profile or model. In such an embodiment, key press states for each possible key press and key press combination may be pre-programmed into the system and the system can begin tracking key presses immediately based on the initial settings. It should also be appreciated that although different users will have different sized hands, fingers and motions, general key states can be defined and a threshold level of change can be used to widen the acceptance range for various key states. The calibration process can include instructing a user to move his or her fingers to a particular position to be associated with a particular key press, and then recording data associated with the detected position. In other embodiments, a user may be instructed to perform this process a number of times, such as X times for each of the key presses to be defined. The position data can represent and exact position or a range of positions. The range of positions can be adjusted to be larger or smaller depending on the accuracy of the reader.

If a calibration action is performed 1002, the calibration can simply require the user to put his or her hands into the rest or ready position for a period of time, and then, based on the user finger locations, the system can then generate key state positions for each of the possible key presses or key press combinations. In another embodiment, the calibration process may require the user to make certain motions, such as a subset of the possible key presses, and then generate the remaining key states based on this information. Yet in another state, the calibration action may require the user to make motions for typing each of the potential key presses.

It should also be appreciated that a calibration process can be useful for defining any keyboard type of structure and any typing style. For instance, if a user desires to have a keyboard that is not based on the standard QWERTY key layout, the engine can accommodate the non-standard keyboard layout by defining the key presses through the calibration process or obtaining pre-created profiles. Similarly, if a user does not type using the common typing techniques, the engine may still be able to detect key press states. For example, if the user types by what is referred to two finger typing (find and poke) the calibration process can still be utilized to identify the key states for fingers moving in this manner. As another example, users that type on handheld devices may type using only their thumbs. In any of these as well as other styles, the 3D reader can detect various states for each of the potential key presses and the calibration process can be used to define the key states for each of the possible key presses.

Similarly, without the calibration process, various keyboard layouts and typing techniques can be pre-loaded into the system thus bypassing any requirement for the calibration process 1002. Further, different profiles can be stored in a system and loaded into the system depending on various requirements. For instance, a different profile can be constructed for each user and then loaded into the system when that particular user has logged in or has otherwise identified him or herself to the system.

Once system has been calibrated, or the appropriate profiles or internal models have been loaded into the system and the system has been initialized, the engine enters into a loop that operates to look for and detect a state change 1004 caused by motion of the fingers. For instance, if the fingers are in the "at rest" or "ready" state, any movement of the fingers that causes the position of the figures to no longer qualify as the ready state can be interpreted as a state change. At this point, the engine then attempts to evaluate the position of the fingers to identify a new state 1006. If a state change is not detected, the engine simply continues looping or delaying until the fingers are moved a sufficient amount to trigger a state change. In an exemplary embodiment, the system may operate to make hundreds of readings per second and as such, many readings can be made before a state change is detected. Further, readings can be averaged to provide a level of hysteresis to prevent false detections and/or to provide a "debounce" type function.

Once a key state change is detected, the engine then determines if the position of the fingers in the new state is a valid key state. If the position of the fingers does not match a valid key state 1006, then the engine may look to see if the new state is a control state 1020. Otherwise, if the new state is a valid key state, the engine operates to enter the key stroke into the system 1008. Entering the key stroke into the system 1008 can be performed in a variety of manners, as previously presented. For instance, entering the key into the system may result in displaying a character associated with the key on a display device. In general, the key stroke is presented to the system through any of a variety of interfaces.

After the key press has been entered, the system and/or user can perform validation on the entered key stroke to determine if the correct key was entered or, if the system has falsely detected the wrong key state. For instance, the user can easily see the character that was entered by visually examining a display if the characters are being rendered onto a display. In addition, the system can automatically detect errors or suspicious key press entries. For instance, an application that is expecting input can perform a level of validation of the data. An error can be triggered by the system if the application is expecting a number but receives a letter, if the characters form a misspelled word, or other data input knowledge rules can be applied to detect erroneous key press entries or suspicious key press entries.

If the system detects that an incorrect key was entered 1010, the engine can then invoke an adjustment of the internal model or profile 1012. The engine may do this automatically or, the user can be prompted to take a particular action to invoke an adjustment of the internal model. For instance, the user may receive a visual and/or audible prompt indicating that a key press entry error has occurred. The system can employ the use of several actions for adjusting the internal model or profile in response to an key press entry error. The adjustments may be made with regards to a specific user, the specific internal keyboard model or both. In response to an error detection, the variation tolerance for a particular key state may be reduced or tightened to avoid a false detection Likewise, if detected errors are at a very low percentage, such as 10%, 1% or 0.01% as non-limiting examples, the tolerance for the various key states may be increased or loosened so as to minimize processing required to detect new key states. Thus, in some embodiments, the tolerances for the key states may dynamically change in response to detected error levels.

If the system and user do not detect a key press entry error, the engine returns to the state change detection loop 1004. The user may then simply continue to move his or her fingers into the next desired key-state by mimicking the physical actions of pressing a key. In this manner, the user effectively types whatever he or she wants on any surface, on the user's lap, or even thin air, as long as the reader can identify and track the user's fingers.

However, if the user does detect an error in the key press entry, the user can then take an action to notify the engine that the key press entry is incorrect. As a non-limiting example, if a user observes an incorrect interpretation of a key press, the user can provide an indication of such by use of a predetermined motion that does not conflict with any other valid key-states, such as moving the fingers to a "control state". Non-limiting examples of control states may include raising all fingers, raising all fingers on the left hand, raising all fingers on the right hand, moving two fingers forward or backward, making a swiping gesture, etc. In operation, the engine detects the state change associated with the control state and determines that the newly detected state is not a valid key state 1006, the engine then operates to determine if the new state is a valid control state 1020.

If the new state is not a valid control state 1020, the engine returns to the new state detection loop 1004. However, if the new state is a valid control state 1020, the engine operates to process the control state.

Various control states can be defined in various embodiments of the system, and similar to the key press definitions, the control states can be loaded into the system through a calibration process or by being previously loaded into the system as a profile or model. As non-limiting examples, some control states may include, key press entry error, erase back to the first space, cause a caps lock state to be entered, cause a numbers lock to be entered, invoke a reset or force recalibration, etc. In the illustrated engine process, if a control state is detected, the control state will be processed by one of three available modules: a recalibrate module 1022, a process control module 1024 and an entry error module 1026. It will be appreciated that in other embodiments, other additional modules or fewer modules can be utilized for processing these control states as well as others. But, in the illustrated embodiment, only two specific control state processing modules and one catch all processing module are illustrated. If the control state is determined to be a request to recalibrate, the recalibrate module 1022 causes the engine to return to the calibration action 1002.

If the control state is a gesture or a predefined action that the user performs to indicate that the entered key press is an error, the system may process the entry error control state 1026 by removing the key from the system (i.e., erase the character from the display) and make adjustments to the internal module by continuing the process at the adjust internal module action 1012. After this occurs, processing returns to the state change detection loop 1004 where the user will then be able to try to enter the key press again by reproducing the intended key-pressing action.

If the control state is not a recalibrate or entry error control state, in the illustrated embodiment, a general process control module 1024 processes the control state and then the process returns to the state change detection loop 1004. The process control module can perform functions such as, toggling the state of a caps lock, changing which profile or module is loaded, pausing the state detection loop, etc.

Alternative Methods/Implementations

The 3D reader and engine can be configured in a variety of manners and different embodiments may include differing functionalities. A few non-limiting examples of variations that may be implemented into different embodiments are reviewed below.

In some embodiments, the number of fingers required in determining a unique key state or control state may vary. For instance, as previously mentioned, embodiments may be implemented to support two finger typing. Other embodiments may also be used for users that have missing digits. It will also be appreciated that the calibration process can accommodate any such requirements.

In some embodiments, the number of ways to determine if a key-state has been reached may vary. For instance, some users may be very chaotic in their typing and require a large margin of error. As such, more samples may be required for detecting a valid key state in such circumstances. Further, if a larger number of key entry errors are detected, the system may automatically increase the number of samples required to detect a valid key state change. Similarly, the system may progressively decrease the number of samples until errors are detected.

Many methods may be utilized to identify the ready state. As previously mentioned, the user may place his or her fingers into a standard default position for typing. However, in other embodiments, the user may not have to have his/her hands within the traditional touch-typing position but may, for example, have both hands in a first to tell the system that the user is ready to type.

As previously mentioned, the user can place his or her hands onto a surface for the 3D reader. However, in other embodiments, an actual surface is not necessary and the user can type in mid air. Further, the hands do not necessarily have to be together. For example, hands may be placed in a vertical orientation, may be separated by considerable distance, the palms can be facing the 3D reader, etc.

Although embodiments have been described for a keyboard detector in which the user mimics keyboard, presses, it should be appreciated that other techniques to identify key states may also be used. For instance, the 3D reader may be utilized to detect American Sign Language, or other sign language hand gestures for various letters and numbers, actually writing motions of a writing instrument forming the letters, reading lip motions when a user speaks the letters or sounds, etc. Further, with the calibration process, the user can virtually define any gestures or movements as valid key presses.

It will also be appreciated that the various embodiments can be utilized for full key boards, extra functionality key boards, number pads, court reporting and shorthand keyboards, etc.

It will also be appreciated that a key state may not have to be unique to provide value to the system. For instance, a lower-case and upper-case key state may be considered the same key state in some embodiments. In addition, a given key state may be defined in many possible dimensions. For instance, the key state may be defined in multiple three dimensional definitions depending on the angle of view of the hands. Further, key states may be defined in two dimensions as well. Even further, the key states may be identified using cameras, accelerometers, infra-red detectors as well as other sensors and detectors.

The engine may process the key state data in a variety of manners. As previously mentioned, key states may be defined with levels of variation tolerance. Thus, the key state for pressing a "u" key may be expanded such that a "u" key press is detected if the right index finger is on the left side, right side, top, bottom or center of an area defining the "u" key zone. Further, the tolerance of the "u" key zone can be increased if there is not a threshold amount of motion detected by the other fingers, such as the middle and ring finger on the right hand, which would be indicative of the "y" key being pressed.

Figure 11:
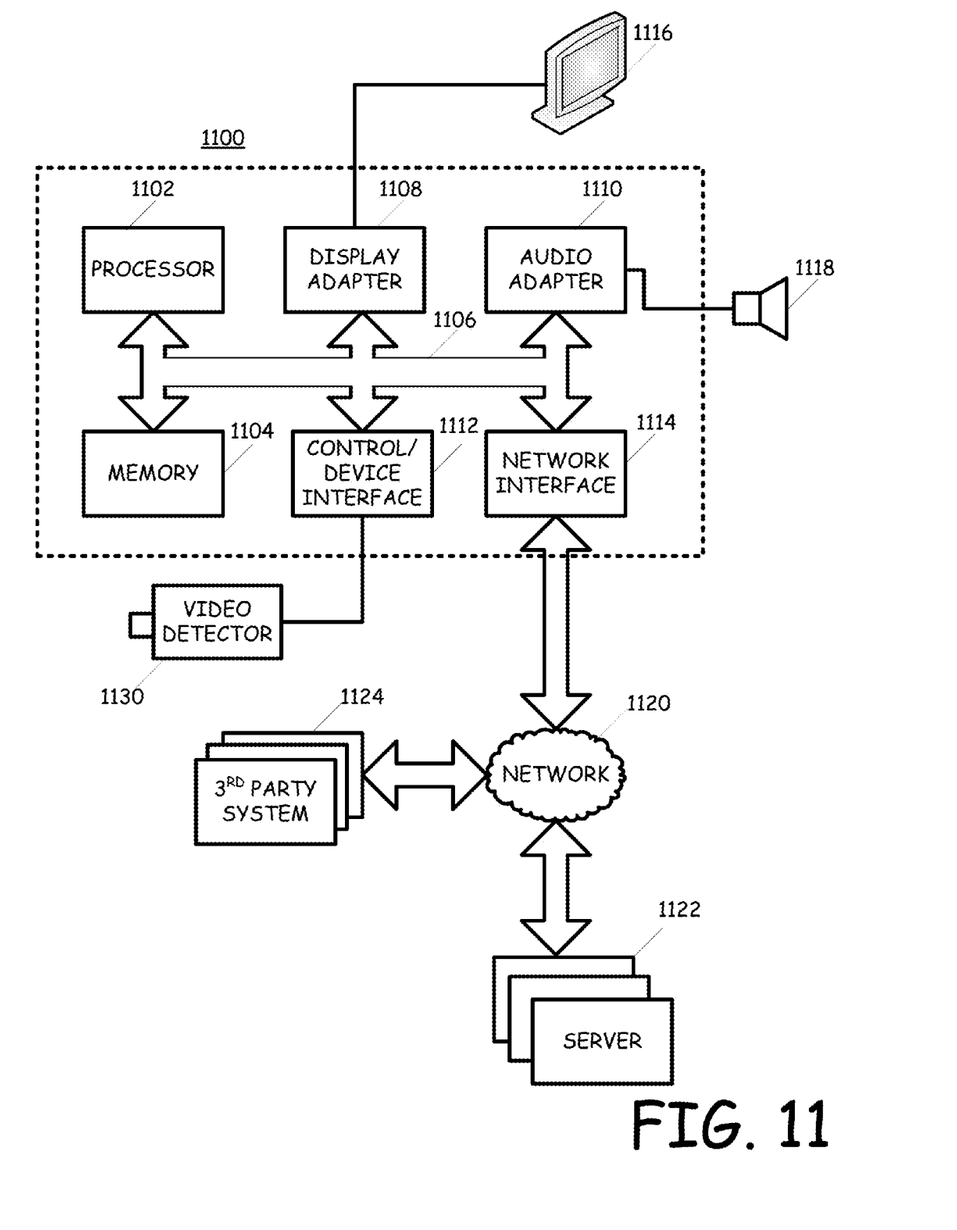
FIG. 11 is a functional block diagram of the components of an exemplary environment or system or sub-system implementing various aspects of embodiments of the reader and engine or, in which the reader and engine may be incorporated.

FIG. 11 is a functional block diagram of the components of an exemplary environment or system or sub-system implementing various aspects of embodiments of the reader and engine or, in which the reader and engine may be incorporated. It will be appreciated that not all of the components illustrated in FIG. 11 are required in all embodiments of the reader and engine but, each of the components are presented and described in conjunction with FIG. 11 to provide a complete and overall understanding of the components. The environment can include a general computing platform 1100 illustrated as including a processor/memory device 1102/1104 that may be integrated with each other or, communicatively connected over a bus or similar interface 1106. The processor 1102 can be a variety of processor types including microprocessors, micro-controllers, programmable arrays, custom IC's etc. and may also include single or multiple processors with or without accelerators or the like. The memory element 1104 may include a variety of structures, including but not limited to RAM, ROM, magnetic media, optical media, bubble memory, FLASH memory, EPROM, EEPROM, etc. The processor 1102, or other components in the controller may also provide components such as a real-time clock, analog to digital convertors, digital to analog convertors, etc. The processor 1102 also interfaces to a variety of elements including a control/device interface 1112, a display adapter 1108, an audio adapter 1110, and network/device interface 1114. The control/device interface 1112 provides an interface to external controls or other devices such as the video detector 1130. Other devices may include motion sensors and other sensors, actuators, drawing heads, nozzles, cartridges, pressure actuators, leading mechanism, drums, step motors, cameras, a keyboard, a mouse, a pin pad, an audio activated device, as well as a variety of the many other available input and output devices or, another computer or processing device or the like. In the various embodiments, the devices may specifically include a camera and/or infrared sensor for detecting finger or object motion. However, it will be appreciated that the camera and/or infrared sensor may also be included internal to the platform 1100. The display adapter 1108 can be used to present a variety of information onto a display device 1116, as well as provide other visual aspects of a user interface. An exemplary display device may include an LED display, LCD display, one or more LEDs or other display devices. The audio adapter 1110 interfaces to and drives a sound producing element 1118, such as a speaker or speaker system, buzzer, bell, etc. The network/interface 1114 may interface to a network 1120 which may be any type of network including, but not limited to the Internet, a global network, a wide area network, a local area network, a wired network, a wireless network or any other network type including hybrids. Through the network 1120, or even directly, the controller 1100 can interface to other devices or computing platforms such as one or more servers 1122 and/or third party systems 1124. A battery or power source provides power for the controller 1100.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A system for providing input to a computing device without requiring a keyboard, the system comprising:
    a sensor configured to:
        detect finger and/or hand and/or or mouth and/or lip and/or facial movement activity of a user;
        generate data associated with the finger and/or hand and/or or mouth and/or lip and/or facial movement activity; and
        provide the and/or hand and/or or mouth and/or lip and/or facial movement activity data to an engine;
    the engine configured to:
        process the received and/or hand and/or or mouth and/or lip and/or facial movement activity data to identify a speech element; and provide indicia data associated with the identified speech element to the computing device, wherein the computing device can react to the indicia data as data entry and wherein the system does not require a physical, projected, or other representation of a keyboard and wherein the engine is configured to access a model file defining finger and/or hand and/or or mouth and/or lip and/or facial movement activity positions that are associated with speech element states and associating the speech element states with particular indicia data and wherein the engine is configured to enter a training mode to generate the model file by:
        instructing a user to mimic producing a speech element by finger and/or hand and/or or mouth and/or lip and/or facial movement activity;
        recording the position of the user's finger and/or hand and/or or mouth and/or lip and/or facial movement and
        associating the position of the user's finger and/or hand and/or or mouth and/or lip and/or facial movement activity as a speech element state associated with the particular movement.

2. The system of claim 1, wherein the engine is further configured to receive input from a user indicating that indicia data for the identified speech element is incorrect.

3. The system of claim 2, wherein the engine is further configured to instruct the computing device to discard the incorrect indicia data and commence receiving of finger and/or hand and/or or mouth and/or lip and/or facial movement activity data.

4. The system of claim 1, wherein the sensor is a camera and the finger and/or hand and/or or mouth and/or lip and/or facial movement activity data is video data.

5. The system of claim 1, wherein the finger and/or hand and/or or mouth and/or lip and/or facial movement activity includes finger motion and finger position.

6. The system of claim 2, wherein the input from a user indicating that indicia data for the identified speech element is incorrect is provided by a user making a finger and/or hand and/or or mouth and/or lip and/or facial movement activity that is not associated with a particular key press but is associated with a control state.

7. The system of claim 1, wherein the finger and/or hand and/or or mouth and/or lip and/or facial movement activity can be any motion that is defined as being associated with a particular speech element.

8. The system of claim 1, wherein the engine is further configured to access a model file defining finger and/or hand and/or or mouth and/or lip and/or facial movement positions that are associated with speech element states and associating the speech element states with particular indicia data.

9. The system of claim 8, wherein the engine is further configured to enter a training mode to generate the model file.

10. The system of claim 1 wherein the finger and/or hand and/or or mouth and/or lip and/or facial movement activity are correlated with American Sign Language.

11. The system of claim 1 wherein the model file is correlated with American Sign Language.

* * * * *